United States Patent [19]

Spicer

[11] Patent Number: 4,902,315
[45] Date of Patent: Feb. 20, 1990

[54] NEGATIVE PRESSURE ASBESTOS REMOVAL WITH LOCALIZED MAKE-UP AIR

[76] Inventor: R. Christopher Spicer, 236 Merion Ave., Haddonfield, N.J. 08033

[21] Appl. No.: 358,276

[22] Filed: May 26, 1989

Related U.S. Application Data

[63] Continuation of Ser. No. 126,390, Nov. 30, 1987, abandoned.

[51] Int. Cl.⁴ ............................................. B01D 46/42
[52] U.S. Cl. ..................................... 55/97; 55/385.2; 55/419; 55/467; 98/40.19; 98/DIG. 7
[58] Field of Search ................ 55/97, 274, 385.2, 419, 55/467, 472, DIG. 29; 98/38.6, 40.19, DIG. 7

[56] References Cited

U.S. PATENT DOCUMENTS

| | | | |
|---|---|---|---|
| 1,684,474 | 9/1928 | Chatham | 98/40.19 |
| 2,115,482 | 4/1938 | Crewe | 98/DIG. 7 |
| 2,209,054 | 7/1940 | Doud et al. | 98/DIG. 7 |
| 2,347,334 | 4/1944 | Schmieg | 98/DIG. 7 |
| 2,480,441 | 8/1949 | Bingham | 98/DIG. 7 |
| 3,158,457 | 11/1964 | Whitfield | 55/385.2 X |
| 3,766,844 | 10/1973 | Donnelly et al. | 55/385.2 X |
| 3,998,142 | 12/1976 | Foreman et al. | 55/97 X |
| 4,023,472 | 5/1977 | Grunder et al. | 55/385.2 X |
| 4,255,176 | 3/1981 | Macrow | 55/385.2 X |
| 4,362,091 | 12/1982 | Cox | 98/40.19 |
| 4,390,357 | 6/1983 | Myers et al. | 55/97 X |
| 4,549,472 | 10/1985 | Endo et al. | 55/385.2 X |
| 4,604,111 | 8/1986 | Natale | 55/97 |
| 4,723,969 | 2/1988 | De Marco | 55/97 |

OTHER PUBLICATIONS

Statutory Invention Reg. No. H 460, published Apr. 5, 1988, Werner, "Decontamination System".
Asbestos, vol. 1, Properties, Applications, and Hazzards, Michaels (editor), 1979 (John Wiley & Sons), Chapter 8, pp. 279–304.

Primary Examiner—Robert Spitzer
Attorney, Agent, or Firm—Caesar, Rivise, Bernstein, Cohen & Pokotilow

[57] ABSTRACT

A method of removing airborne contaminant material from a work area by isolating the work area from the surrounding environment, providing at least one entrance into the isolated work area, and creating a negative pressure within the isolated work area by exhausting the air therefrom. Make-up air is introduced into the isolated work area by ducting the air directly to the vicinity where the contaminant material is being removed in order to entrap airborne contaminant material created when the contaminate material is being removed. The air being exhausted from the isolated work area is filtered to remove the contaminant material therefrom. A manifold and ducting assembly are also provided to regulate and direct the flow of make-up air to the vicinity where the contaminatn material is being removed.

12 Claims, 5 Drawing Sheets

NEGATIVE PRESSURE ASBESTOS REMOVAL WITH LOCALIZED MAKE-UP AIR

This application is a continuation of Application Ser. No. 126,390, filed Nov. 30, 1987, now abandoned.

FIELD OF THE INVENTION

This invention relates to negative air pressure asbestos removal, and in particular relates to negative pressure asbestos removal provided with localized make-up air.

BACKGROUND OF THE INVENTION

The removal of asbestos materials from buildings has evolved into a procedure with fairly standard practices and environmental controls. These have been reinforced by recent State and Federal (OSHA) regulations controlling the construction and renovation industry which now mandate practices of isolation, HEPA (high efficiency particular air) air filtration, and establishing a negative pressure enclosure. Prior art, such as the patent to Natale, U.S. Pat. No. 4,604,111, also teaches the use of negative pressure in the removal of asbestos.

A typical asbestos removal site is prepared by sealing all penetrations into the work area and covering floors, walls, and horizontal surfaces with plastic sheeting. An artificial "bubble" is thus created into which there is only one entrance which serves both as the worker's access and decontamination facility. Fans with highly efficiency HEPA filters are situated within the work area to exhaust air from within the enclosure to the surroundings. Make-up air is provided through the worker's access/decontamination unit, and the constant exhausting of large volumes of filtered air from within the work area relative to the much smaller amounts of make-up air admitted through the decontamination unit creates a negative static pressure relative to the surrounding spaces. The dual features of these ventilation units, namely—the production of a negative static pressure within the enclosure and the air filtration capability of the HEPA filters, has caused an unclear perception with regard to the actual purpose and applicability of this widespread engineering technique. This standard feature of asbestos work zones is presently not clearly defined from the perspective of industrial hygiene ventilation and retains features of an industrial hygiene as well as an environmental control. Consideration of the "negative air" concept as industrial hygiene ventilation allows a more clear description of its capabilities and limitations, as well as enabling alternatives from current practice in controlling airborne asbestos.

The basic concept and empirical derivations of industrial hygiene ventilation that are standard today have evolved over the last forty or fifty years. The variety of aerosols and vapors to be controlled in classical industrial hygiene settings have generally been incidental to the formuation of some desired material, and engineering solutions to these airborne hazards have taken two approaches. General dilution ventilation (the first approach) as been most applicable where the generation of a relatively low hazard contaminant evolves from such a widespread area that point control by local exhaust at the source is impractical. An example of this would be the general ventilation necessary to maintain an office environment free of excessive cigarette smoke. The object of the general dilution type of control method is to bring enough fresh air into an area to reduce airborne concentrations to some acceptable concentration, which is either some guideline value, regulatory standard, or comfort level. Factors such as contaminant characteristics (e.g., toxicity), quantities generated, seasonal variations, and building configuration have led to standardized formulas describing quantities of air necessary for this type of control.

Local exhaust ventilation, the second fundamental technqiue of industrial contaminant control, attempts to confine a contaminant-generating process as much as possible within an enclosure termed a hood. Through the use of exhaust fans and the hood configuration, the contaminant is captured as close as possible to the source. From there it can be channeled via ductwork to some location where the toxic agent can be controlled for disposal or some appropriate treatment. Recognizing that for effective capture, certain hood/ductwork design and fan capacities are necessary to create enough "capture velocity" for a given contaminant, several empirically derived design formulas are currently the industrial hygiene engineer's guidelines in designing the local exhaust system.

These two approaches characterize the industrial hygienist's attempts at contaminant control and the distinction between the two has usually been clearly defined. In the asbestos control industry however, standard negative air ventilation techniques as well as the features of the typical work site are somewhat different from the seen in the typical industrial or manufacturing setting. The mose obvious difference is that a typical asbestos control site is in a non-industrial structure. This not only requires controls of the obvious occupational exposure within the work containment, but also necessitates that the airborne asbestos dust be confined so that space to protect the surrounding environment.

Additionally, because asbestos control (i.e., removal projects often are conducted in occupied buildings, the potential for exposure of other persons outside the asbestos removal work area to asbestos dust (if not effectively contained) initiates concerns for non-occupational exposure. While there are presently no legal standards for such exposure, the liability implications are far-reaching. Therefore, the very nature of an asbestos project mandates control over the occupational exposure within the work area as well as an environmental control to prevent contamination into the adjacent (and often occupied) spaces. An apparent conflict thus arises, since confining airborne asbestos to the work area inherently produces an increased exposure to personnel working in that area. In turn, increased exposure caused by the confinement necessitates more cumbersome personal protective equipment, and results in a reduction in worker productivity.

Because the common operation of negative pressure enclosures is based upon exhaust fans drawing make-up air through the decontamination unit entrance from the adjacent clean spaces, the system superficially performs the function of dilution ventilation. Current industrial hygiene practice dictates that dilution ventilation is acceptable for low hazard solvents in which quantities of fresh air will lower the concentration of a contaminant below a certain acceptable level. The quantities of air necessary can be calculated since the rate of contaminant (vapors) generation is generally predictable for a specific operation and the air can be distributed to localized areas via ductwork. The nature of asbestos removal, however, is such that the rate of airborne asbestos fiber generation is seldom constant due to the variety of asbestos-containing building products encountered. Even if dilution were applicable to particulates rather than vapors, the dilution capacity that may be adequate in maintaining a specific work area airborne asbestos particulate concentration while removing low asbestos percentage acoustical plaster will not maintain the same airborne concentrations when removing a high percentage deck fireproofing. (Asbestos fireproofing for example, may result in short term personnel exposures from the action limit to 100 fibers/cc depending upon work practices.) Architectural configuration of work zones is another consideration which makes dilution capacity difficult to determine, since office partitions, corridors,, etc., influence air flow and fresh air mixing, and vary greatly from one worksite to the next.

The fact that large quantities of air are exhausted and filtered during the negative pressure asbestos removal process has led to a misconception that the primary purpose of the air filtration is to "clean the air" and thereby reduce the worker exposure. While this may occur to a limited degree, the dilution ventilation capability of the typical negative air arrangement is inferior for reduction of worker exposure since the contaminant of concern, asbestos, has a high toxicity, the generation rate is highly variable, and the asbestos exposure is a result of several point sources within a large area. This is especially true where a high asbestos percentage surface coating (e.g., fireproofing) is being removed.

If asbestos removal is the enclosed work area is analogous to working in a large hood (i.e., enclosed process with exhaust fans), then consideration of the negative air enclosure can be made in terms of local exhaust ventilation. Air filtration units are commonly placed at convenient locations within the work area, usually at the perimeter with an exhaust duct leading to a "clean" area outside the work zone. In the alternative, the intake force of the filter may protrude through the containment or isolation barrier of the work zone, while the bulk of the machine which houses the HEPA filter fan and exhaust duct is situated in the adjacent "clean" space. This latter arrangement facilitates cleaning of the unit at the end of work (as opposed to its location within the work areas); regardless of the position of the filter, the velocity of intake air, which defines the ability to capture the generated asbestos dust, is virtually nonexistent at any substantial distance from the face of these units. One need only visualize air flow via smoke at various distances to verify that the capture velocity into the unit is negligible. Perimeter placement of the air filtration device as described above can be characterized, in terms of local exhaust ventilation, as a flanged hood. The air velocity into such a hood is described by the formula:

$$V = \frac{Q}{.75(A + 10x^2)}$$

where:
Q=volume of air exhaust in cubic feet per minute
A=area of the hood opening (approximately 3.35 square feet for the common 22 inch square intake)
x=distance from the hood in feet
V=velocity of air at distance X in feet per minute The two areas of highest air velocity in a work area are the decontamination entrance (theoretically the only make-up air inlet) and the intake face of the air filtration devices. The distance between these two locations is characterized by a negligible flow of air with "dead spots" (a common problem in dilution ventilation) and virtually no air exchanges depending on the dimensions and non-uniformity (i.e., alcoves, office partitions, etc.) of the work area.

Considerations up to this point have been with regard to quiescent, inactive conditions. However, when one considers the high activity in the asbestos removal zone (work area) and the fact that simply walking at a normal pace generates air flow of 50–70 feet per minute (fpm), it is quite unreasonable to expect air filtration devices to substantially reduce personnel exposure when their "capture velocity" is 140–180 feet per minute at a one foot distance, and less than 75 feet per minute at two feet from the intake. (This can be compared to the recommended velocity for local exhaust for an enclosed asbestos debagging operation in industry of 200 feet per minute in an enclosed hood.)

The design of negative air systems too often only gives consideration to total air volumes exhausted without recognizing the characteristics of exhaust ventilation. The proximity of the exhaust units to the worker's removal activity within the work area is more a determining factor than total air flow if a local exhaust capability is desired. Unfortunately, workmen are not inclined to position air filtration devices close enough (i.e., within a foot) to the actual removal activity for effective collection of airborne asbestos dust. While the filtration devices can be equipped with an intake manifold and extended flex duct (12 inch diameter), the flow of air into a round open duct is described as $$V = \frac{Q}{A + 10x^2}$$

This provides at best a capture velocity of 140–180 feet per minute at a one foot distance from the dust opening, and less than 50 feet per minute at a distance of two feet. Thus, normal work activity negates any local exhaust ventilation capability for most asbestos work areas, since no substantial velocity exists for airborne asbestos to be captured by air filtration devices.

The current practice in the asbestos industry is to specify four air changes per hour for the work enclosure. However, determination of ventilation requirements based upon air changes is generally viewed as an unacceptable criteria by ventilation engineers, but is an unfortunate convenience due to the variability of exposure in asbestos work and the nature of changing work sites as previously discussed. The four air changes per hour "standard" is best viewed not as a method of controlling exposure to workers, but rather as a guideline to exhaust a sufficient quantity of air to maintain the negative static pressure within the work area. The guideline static pressure differential of 0.02 inch w.g. has also become standard, and is generally accepted as sufficient since this will produce noticeable drafts around windows, doors, etc. in general building ventilation. An effectively contained asbestos removal zone should contain only small leaks (if any), and with a draft initiated by a 0.02 inch w.g. differential, escape of airborne asbestos through such openings should be prevented. The fact that the exhaust from the air filtration units is filtered enables discharge of uncontaminated air to the surroundings, but does not necessarily relate to any appreciable reduction in work exposure within the contained work area during active removal.

OBJECT OF THE INVENTION

It is an object of this invention to provide an improved method and apparatus for use in conjunction with a negative air environment for asbestos removal from a confined area.

It is an object of this invention to provide an improved distribution of make-up for asbestos removal from a confined area.

It is an object of this invention to provide a method of negative pressure asbestos removal from a confined area wherein localized make-up air is directed to the site of asbestos removal activity.

It is an object of this invention to provide an improved method of negative pressure asbestos removal from a confined area wherein air flow within the removal area or work zone is described in terms of desired air velocity and not simply air changes per hour.

It is an object of this invention to provide a method for more effectively entraining asbestos fibers for removal by filtration equipment.

It is an object of this invention to provide a method of negative pressure asbestos removal from a confined area wherein the make-up air can be obtained directly from outside the structure where the asbestos is being removed.

It is an object of this invention to provide a manifold for use in a method of negative pressure asbestos removal from a confined area so that make-up air to the confined area can be obtained directly from outside the structure.

It is an object of this invention to provide a manifold for use in a method of negative pressure asbestos removal from a confined area wherein the amount of make-up air admitted into the confined work area can be adjusted.

It is an object of this invention to provide a method of negative pressure asbestos removal from a confined area wherein make-up air can be obtained from inside the structure while by-passing the usual decontamination unit.

It is an object of this invention to provide a manifold for obtaining make-up air in a process of negative pressure asbestos removal from a confined area from inside the structure while by-passing the decontamination unit.

It is an object of this invention to provide a method of negative pressure asbestos removal from a confined area wherein the make-up air flow into the removal area or work zone can be increased with a minimum diminishment of negative pressure differential.

SUMMARY OF THE INVENTION

These and other objects of this negative pressure asbestos removal invention are achieved by providing a method for removing airborne contaminant material from a work area where contaminant material is being removed by isolating the work area from the surrounding environment and providing at least one entrance into said isolated work area. A negative pressure is created within the isolated work area by exhausting air therefrom and make-up air is ducted into the isolated work area directly to the vicinity where the contaminant material is being removed in order to entrain the airborne contaminant material created when the contaminant material is being removed. The air containing the entrained contaminants is exhausted from the isolated work area and filtered to remove the contaminant material therefrom.

In order to perform the method, the invention also provides a manifold for placement in a window frame within the isolated work area. The manifold has a plurality of ports therethrough with sleeves attached to the ports on the side of port within work area. Ducting is connected to the ports to conduct air incoming through the ports directly to the vicinity where the contaminant material is being removed. A damper is provided within the sleeve to control the air flow through the sleeve and duct. The end of the duct opposite the end connected to the sleeve has a closure member which closes the duct in the event the air pressure within the work area becomes greater than the air pressure within the duct.

BRIEF DESCRIPTION OF THE DRAWINGS

Other objects and many of the attendant advantages of the instant invention will become more readily appreciated when the same become better understood by reference to the following detailed description considered in conjunction with the accompanying formal drawings wherein.

DETAILED DESCRIPTION OF THE INVENTION

Figure 1:
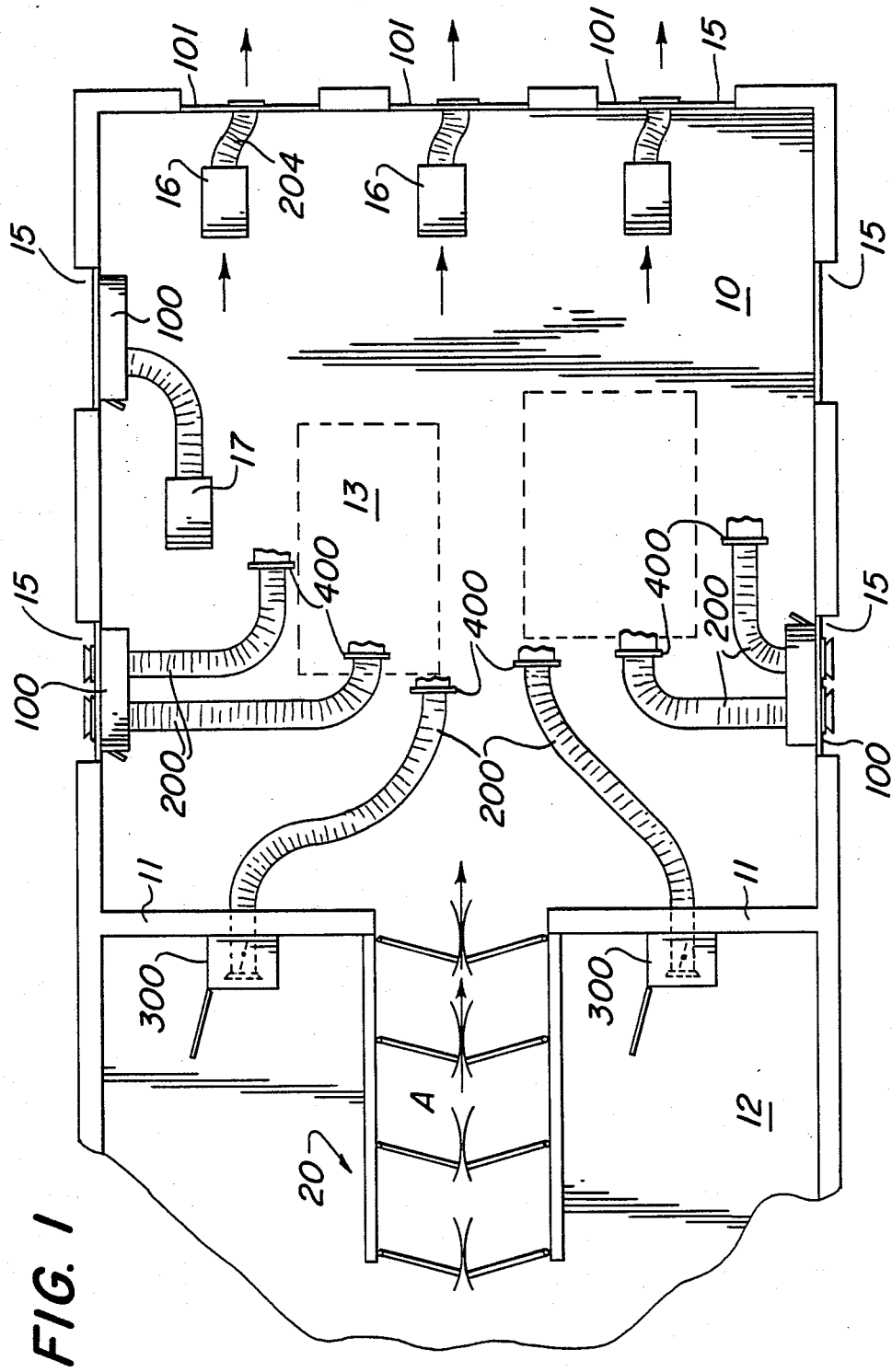
FIG. 1 is a schematic drawing showing the present invention in a contaminated work area.

It is known in the art of asbestos removal, particularly for asbestos removal from ceiling insulations, to seal all points of penetration into the work space and to cover the floors, walls and horizontal surfaces with plastic sheeting to in essence provide an artifical bubble with the only entrance into the bubble being through a special area which serves as the workers' access and decontamination facility. Fans with high efficiency HEPA filters (exhaust units) are situated within the enclosed or confined work area to exhaust air from within the work area or in the alternative the exhaust units are located outside the work area with only the intake ducted into the contaminated area. Make-up air is provided only through the access/decontamination unit. The constant removal of large volumes of filtered air from within the work area by these HEPA filter units creates a negative static pressure relative to the surrounding spaces. Air flow through any possible openings would therefore be into, and not out of, the work space.

The present invention relies on much the same principles of providing a negative pressure enclosure; however, the present invention provides a more effective source of make-up air than simply allowing the air to enter through the access/decontamination unit, increases the velocity of make-up air and thus the particulate capture of entrapment ability of the make-up air, and provides the make-up air directly at the asbestos removal location.

Referring in detail to the various figures of the drawings wherein like reference characters refer to like features, the method and apparatus of the present invention are graphically presented.

As shown schematically in FIG. 1, a contaminated work area 10 is provided which is completely prepared as known in the prior art by sealing all penetrations into the space, and by covering the floors, the walls and all horizontal surfaces with plastic sheeting. An isolation barrier 11 separates the work area 10 from the non-contaminated area 12. A decontamination unit 20 like that known in the prior art is provided as the sole access for workers and supplies into the work area 10. Within the work area 10 are specific work sites 13 denoted by broken lines wherein asbestos removal activity is conducted by the workers. The work area 10 also has windows 15 thereinto. These windows 15 are preferably sealed, except as described later herein. A plurality of HEPA equipped exhaust units 16 are provided within the area 10 to exhaust air therefrom. This arrangement as shown in FIG. 1 is essentially the same as the standard negative pressure asbestos removal environment, except for the specific location of the HEPA units, which will be discussed later.

In the present invention, rather than only provide make-up air (Arrow A, FIG. 1.) through the decontamination unit 20, which is the known method, an adjustable manifold 100 is positioned into one or more of the windows 15 from which the glass has been removed to allow make-up air to enter into the workspace 10 (Arrow B, FIG. 1.) Connected to the manifold 100 are ducts 200. These ducts 200 are lightweight and are of sufficient length to be directed easily to each of the work sites 13 so that the make-up air is expelled directly at each work site 13. The make-up air thus enters through the manifold 100 and flows directly to the work site 13. Like the prior methods, make-up air may also enter uncontrolled through the decontamination unit 20, however, it is preferred to have the make-up air enter throught the manifold where the amount of air can be controlled.

Figure 2:
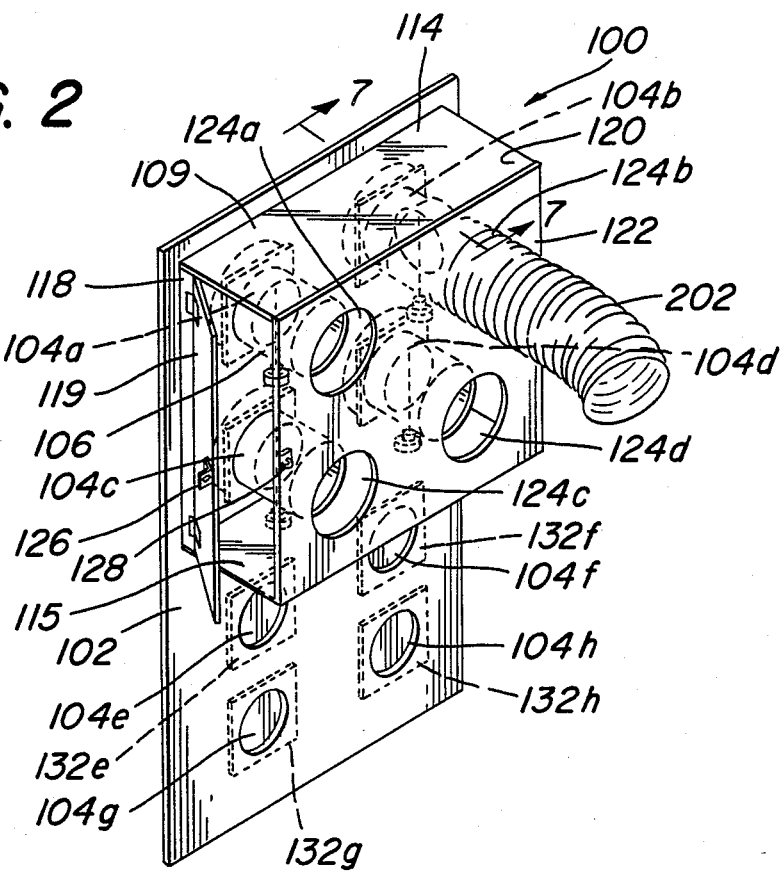
FIG. 2 is a perspective view showing the manifold of the present invention.
Figure 7:
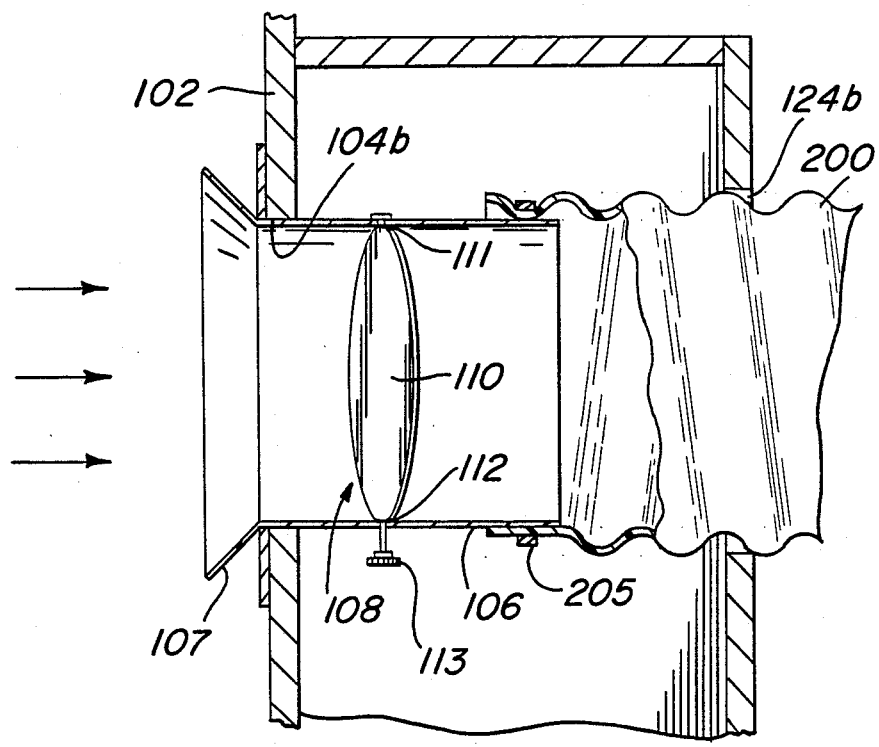
FIG. 7 is an enlarged section view taken along the line 7—7 in FIG. 2.

A more detailed view of the preferred embodiment of the adjustable manifold 100 is shown in FIG. 2. The manifold 100 includes a backboard 102 which fits into and is sealed (such as by sealing the edges by duct tape) within the frame of the window 15 from which the glass has been removed. Through the backboard 102 are a plurality (in this instance, eight) cut-out holes or ports 104(a-h). As shown at the upper left hand port 104(a), a sheet metal sleeve 106 is attached in an air-tight manner through the port 104(a). (While a plurality of sleeves 106 may be supplied, one each through the ports 104(a-h), in order to simplify the description, reference will be made to only one sleeve 106.) As better seen in FIG. 7, within the sleeve 106 is a rotatable circular damper 108 of the type usually found in a duct. The damper 108 includes a circular disk 110 rotatably mounted in the sleeve 106 on two pivot pins 111, 112 respectively. A knob 113 is attached to the lower pivot pin 112 which extends through the sleeve 106. By turning the knob 113, the position of the disk 110 within the sleeve 106 can be altered to control the flow of make-up air through the sleeve 106 and port 104.

Flexible ducting 200 is provided for attachment over the outside of the sleeves 106. (Again, for purposes of simplification, the description will be made with respect to a single duct 200 fitted to the sleeve through port 104(b). Additional ducts may be provided for the remaining ports.) Standard canvas spiral flex duct might be used for each of the ducts, or instead of canvas spiral flex duct, smooth, light-weight polyethylene duct may be substituted. The polyethylene material is lighter in weight and provides for a smaller loss in pressure or flow due to reduced friction loss. Furthermore, while ducts of plastic material are preferred, it has been found that spiral plastic ducts are most preferable, because collapsible ducts require so much air flow just to inflate the duct that a substantial reduction in air velocity is created at the duct outlet. In the preferred embodiment, the ducts 200 are clamped onto the sleeve 106 by using a hose clamp 205 which may be screw tightened.

In FIG. 2, positioned over the top four ports 104(a-d) is, preferably, a cabinet 109. This cabinet 109 has a top 114, a bottom 115, two sides 118, 120 and a front panel 122. Through the front panel 122 are four additional cut-out ports 124(a-d) corresponding to and aligned with the cut-out ports 104(a-d) in the backboard 102. As shown in FIG. 2, the ducts 200 pass through the cut-out ports 124(a-d) in the cabinet 109.

The cabinet 109 prevents unwanted manipulation of the dampers 108 once the dampers have been appropriately adjusted for proper air flow and also prevents the ducts from being accidentally removed from the sleeves. Access into the cabinet is gained by providing a hinged door on one of the side panels, thereby creating a door into the cabinet. As shown in FIG. 2, the side panel 118 is formed with a hinged door 119. In order to lock the panel, a hasp 126 and corresponding U-shaped member 128 positioned to receive the opening through the hasp 126 are installed so that a padlock (not shown) can be installed to lock the panel and prevent the panel from being opened.

The manifold 100 shown in FIG. 2 only has the cabinet 109 positioned over four of the cut-out ports 104(a-d) in the backboard. The four additional cut-out ports 104(e-h) are not utilized in this particular embodiment, and accordingly are covered with air-tight seals 132(e-h) which prevent air from entering or exiting through these ports. If it is necessary to provide increased air flow into the work space, a larger cabinet can be installed and additional dampers and ducting can be provided, or more windows can be removed and additional backboards and cabinets installed. Also, the additional cut-out ports 104(e-h) may be used as exit openings for dispelling filtered air from the work area by attaching ducting from the HEPA units to metal sleeves (not shown) fitted through these openings. As further shown in FIG. 7, a flange member 107 is preferably fitted around the sleeve 106 at the cut-out ports 104. These flange members 107 help to increase the air flow into the metal sleeves 106.

Figure 3:
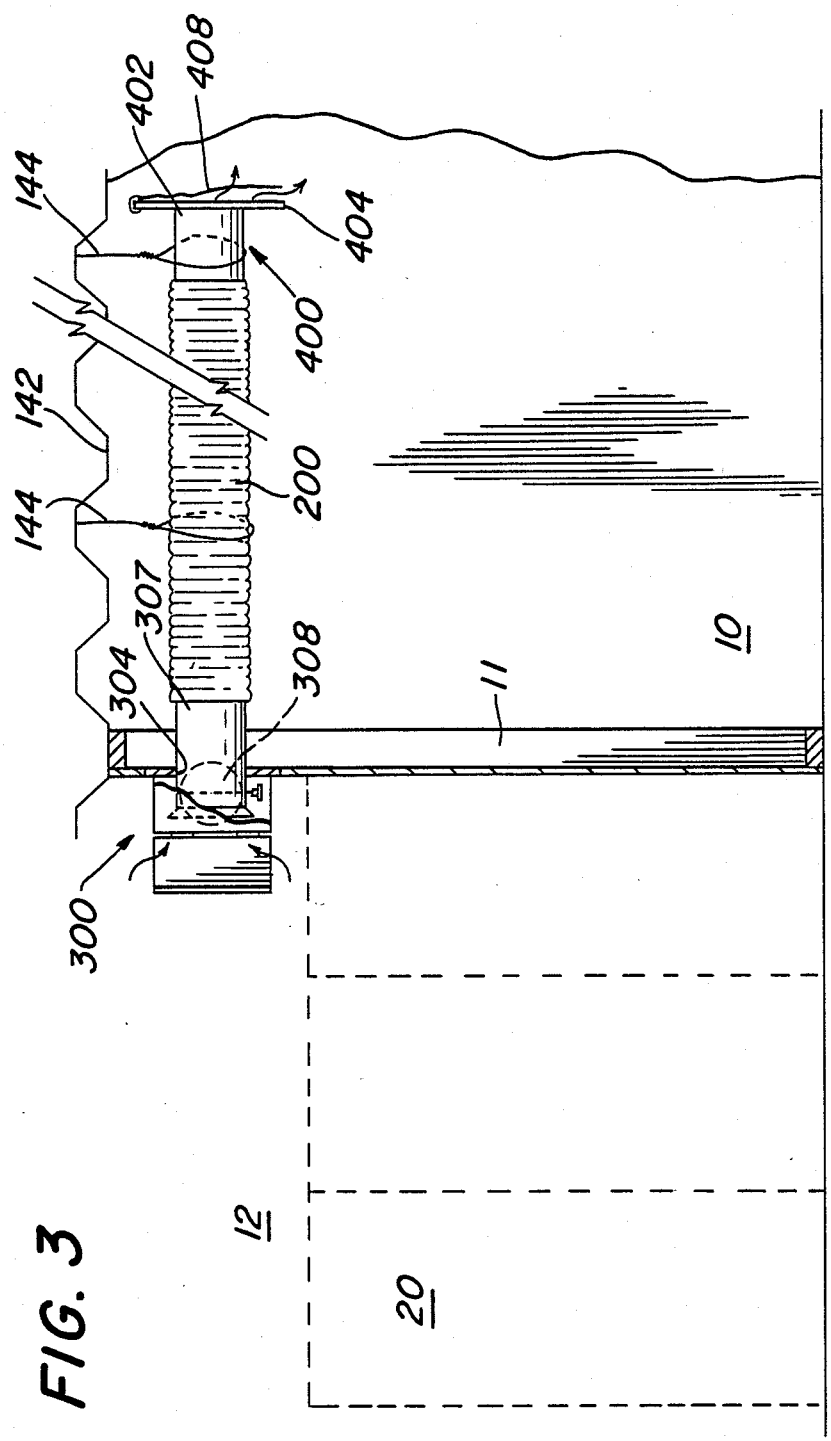
FIG. 3 is a side plan view showing an alternative embodiment of the manifold and ducting of the present invention.
Figure 4:
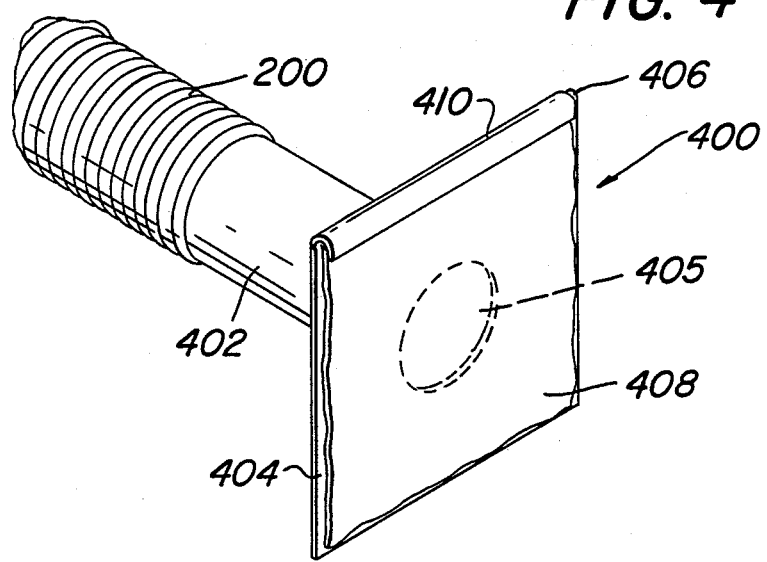
FIG. 4 is a perspective view of the duct closure of the present invention.

The end of one of the ducts 200 extending into the work area 10 is shown in FIGS. 3 and 4. The end of the duct 200 is fitted onto a cap or closure member 400. The cap member 400 includes a sleeve 402 connected to a board member 404 having an openings 405 therein aligned with the sleeve 402. The duct member 200 fits tightly around the sleeve 402 and may be secured thereto by a hose clamp (not shown). Affixed to the board member 404 at the top edge 406 thereof is a lightweight covering or flap 408. The flap 408 can simply be attached to the edge 406 by tape 410 as shown in FIG. 4.

When the damper 108 is adjusted to allow air flow through the duct 200, the air pressure is sufficient to move the flap 408 away from the opening 405 at the end of the duct 200 to allow air to flow into the work area 10. However, should the air pressure (which is maintained in a negative state within the work area) become greater than the pressure within the duct 200, the flap 408 will immediately close by forcing against the board member 404 to seal the opening 405, and thus prohibit any contaminated air within the work area 10 from passing outward through the duct 200. Thus, contaminated air cannot escape through the duct 200 due to increase of pressure within the work area 10.

Within each contaminated work area 10, at least one window 15 is removed and a manifold 100 installed within that window. The manifold 100, of course, is constructed to the appropriate size to fit the window or the opening created in the window. The desired number of ducts 200 are attached at one end to the sleeves 106 and the opposite ends of the ducts connected to the cap members 400 are positioned at the specific work sites 13 where asbestos removal activity is being conducted. As shown in FIG. 4, because the ducts are made of lightweight material, they can be easily suspended from the ceiling grid 142 by means of wires 144.

While the HEPA units 16 may be positioned anywhere within the contaminated area 10 and ducted out of the area through ports in the manifold, it has been found that removal of the airborne contaminant material, e.g., asbestos, is greatly enhanced by positioning the HEPA units at the end of the contaminated area 10 in the direction which the removal work is proceeding. Furthermore, it has been determined that providing a number of HEPA units across the end of the contaminated area as shown in FIG. 2 is much more effective at removing the contaminated air than simply providing one large, centrally located unit. By spacing numerous units across the end of the contaminated area, it appears that an "air sweep" affect is created in the contaminated area 10 which causes an air flow in one direction in the contaminated area similar to that which is created on a smaller scale by providing a slotted hood in a hood-type ventilation chamber. Accordingly, it is preferred that a plurality of HEPA units 16 be provided across one end of the contaminated area. These units can be exhausted through ducts 204 through manifolds 101 positioned in windows 15 which only allow exhaust through the ports and do not have any inlet ducts connected thereto.

Before asbestos removal begins, the HEPA units are started to bring the work area 10 into a negative pressure condition with respect to the surrounding environment. The dampers 108 are opened and air from the outside is allowed to flow through the ducts 200 to the work sites 13 within the negative pressure work area 10. Unlike the prior art processes where make-up air enters only through an opening in the decontamination facility 20, the entrance from the decontamination facility 20 in this instance can be closed or sealed from the work area 10 so that the flow of all make-up is controlled through the manifold 100. As discussed previously, when the damper controls are properly adjusted the manifold cabinet 109 can be locked to prevent any further adjustment of the manifold unless specifically required.

Figure 5:
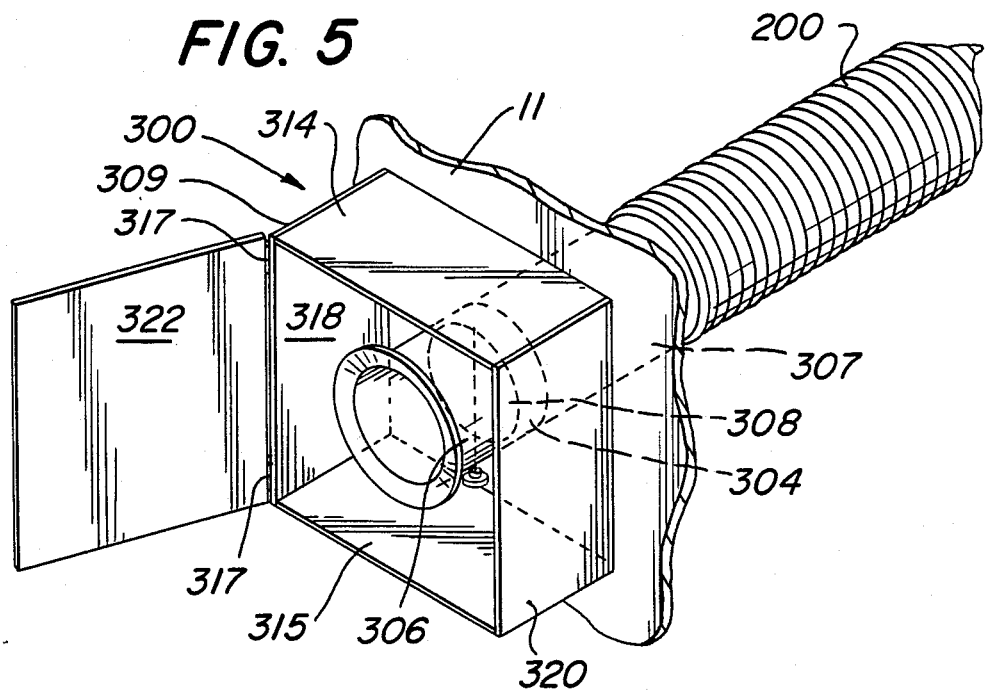
FIG. 5 is a perspective of the alternate embodiment of the manifold of the present invention shown in FIG. 3.

Oftentimes it is not possible to position the manifold 100 in a window, especially when none is available or the work area 10 is isolated from the exterior windows. In such instances it is necessary to install the manifold 100 through the isolation barrier 11 in order to obtain make-up air from the non-contaminated area 12 outside the contaminated work area 10. As shown in FIGS. 1, 3 and 5, a manifold 300 is positioned through the isolation barrier 11 and is connected to a duct 200 which extends into the contaminated work area 10. While there is no particular requirement for the material used for the isolation barrier 11, so long as it functions to isolate the non-contaminated clean area 12 from the contaminated work area 10, it is preferred that isolation barrier be of a rigid material, such as plywood.

The manifold 300 includes a cabinet 309 surrounding an opening or port 304 through the isolation barrier 11. Extending through the port 304 is a metal sleeve 306 attached to the isolation barrier in an air-tight manner. The sleeve 306 has a damper 308 therein constructed similarly to the damper 108 described previously. The sleeve 306 has an extended portion 307 which projects through the port 304 into the contaminated area 10 as shown in FIG. 3. The cabinet 309 is affixed to the isolation barrier 11 and includes top and bottom panels 314, 315 and side panels 318, 320. Attached by hinges 317 is an end panel 322 which can be moved between an open position exposing the sleeve 306 or a closed position which isolates the sleeve 306 within cabinet 309 and prohibits communication between the sleeve 306 and the non-contaminated area 12. A locking arrangement (not shown) may also be provided.

As described in the previous embodiments, the duct 200 is fitted and clamped onto the extended portion 307 of the sleeve 306 within the contaminated work area 10. Attached to the end of the duct 200 within the work area 10 is a cap member 400 with a moveable flap 408, as previously discussed.

By using the manifold 300, it is possible to obtain make-up air from the non-contaminated area 12 and deliver it into the contaminated work area 10 by simply opening the end panel 322 and adjusting the damper control 308 in the sleeve 306. While FIG. 1 shows only two ports 304, 304 through the isolation barrier 11, it is readily apparent that additional ports may be provided.

The embodiment shown in FIG. 1 shows the generally preferred arrangement of ducting 200 and HEPA unit placement. The ducts 200 from either window manifolds 100 or the isolation barrier manifolds 300 (or both) are situated in the work area 10 so that they are up stream of the work site where the contaminant material is being removed. In this manner, the air exiting the duct at the work sites entrains the airborne contaminant particles and carries them toward the HEPA units which are downstream from the work sites 13. Asbestos removal proceeds across the work area 10 in the direction of the HEPA units. The air flow from the ducts continuously blows in the direction of the HEPA units 16 to not only act in directing the air toward the filter units, but also to help prevent the contaminant laden air from dispursing rearwardly to areas which have already been cleaned. This helps to speed up the final cleaning of the contaminated area.

As shown in FIG. 1, the ducts 200 are all positioned so that the air flow is directed toward the HEPA units, thereby creating the "air sweep" toward the filter units spaced across the end of the work area discussed earlier. While both manifolds 300 and 100 are shown as being used in FIG. 1, the combined use of both is optional. Also, make-up air (arrow A) can be provided through the decontamination unit, as known in the prior art, but it is not as easily controlled as by adjusting the dampers in the manifolds.

Also, shown in FIG. 1 by way of demonstration, an HEPA unit 17 is shown connected to a manifold 100. As discussed earlier, the manifolds 100 may also be used to connect HEPA filtering units thereto through the lower ports 104(e-h).

Several case studies using the manifold and ducted localized make-up air technique of this invention have been completed. The projects involved asbestos removal from several floors of two metropolitan high rise buildings. One building contained 95% amosite fireproofing sprayed and tamped onto the corrugated steel deck, while the other building contained 20-25% chrysotile fireproofing sprayed onto the beams with considerable overspray onto adjacent structure.

Standard design of negative pressure enclosures dictates that the primary air make-up should be through the decontamination chamber, in which air enters through an approximately 20 square foot opening or doorway and rapidly disperses when entering into the larger work space. Except for the short time while the workers' are entering and exiting the work area, when the air flow through the decontamination unit prevents the workers from possibly bringing airborne asbestos back into clean spaces, this air flow does not serve any substantial purpose other than to provide make-up air volume. By shutting the decontamination entrance and supplying air either through the extended flex ducts connected to the strategically situated window manifolds, a controlled, directed air stream was produced. This helped to alleviate the static dead spots typical of an asbestos removal zone (such as where make-up air enters only through the decontamination entrance) and provided better movement of the airborne filters to the filtration devices for eventual capture.

In the amosite-containing building, air was evacuated via air filtration devices from various size work zones (5,000 ft-20,000 ft) which translated into the equivalent of approximately twelve air changes per hour. Wooden manifolds such as those described herein were installed in various windows to control the make-up air. Recognizing that a pressure drop in the flex duct attached to the inlets would limit the length of the extension of the duct into the work area, manifolds were spaced based upon anticipated air flow capabilities. This allowed an air supply to be controlled and directed as work activities progressed. Cost factors (e.g., removal and replacement of windows) influence the number of windows that can realistically be used. Therefore, full window plywood manifolds were constructed to serve both as supply air as well as a filtration exhaust. In the second building, a 40,000 square feet work zone (25% chrysotile) was arranged in similar fashion with an exhaust equivalent of eight air changes per hour.

Three parameters were identified to evaluate the effectiveness of the altered ventilation configuration. The primary goal was to increase and control the velocity of air entering the work area. Therefore, determination of velocity of make-up air through the auxiliary ventilation ports at various damper configurations, and at some distance downstream at the mouth of attached flex duct, was necessary.

In the amosite containing building, several field tests determined the velocity of the make-up air at the inlets to be 1100-1500 feet per minute. Ducting the make-up air approximately 50 feet produced a velocity at the face of the open duct of 400-800 feet per minute under normal asbestos work zone conditions.

In the second building, velocity measurements at the open face of thirty foot ducts were 800 feet per minute.

To monitor differential pressures between the isolated work area and the surrounding area, $\frac{1}{4}$ polyethylene pneumatic tubing was installed with two open taps in each of four quadrants of the occupied floor above. Each of the lines was connected to a Dwyer manometer permanently installed in or adjacent to the decontamination chamber of the work area floor below. These were compared to a static line installed in the work area with the open tap in the approximate center of the work area.

The supply and return ductwork of the building's HVAC system which supplied the work floor were blanked, while the fans controlling the adjacent floors operated on a modified schedule to increase the positive pressure on the adjacent occupied floors.

The dampers of the window mounted manifolds were then individually opened and velocity measurements recorded as indicated by a factory calibrated ALNOR (Model 6000) velometer. In so doing, not only were individual velocities recorded, but simultaneous static pressure measurements, as an average of the static input lines from the floor above, were recorded as the ports were opened. These were compared to the static pressure in the work area and in the decontamination chamber.

Finally, a 30 foot canvas spiral flex duct was connected to one of the ports and extended to the site of asbestos removal with two right angles. An average of eight readings were also taken at the face of this open, extended flex duct to test the velocity loss (pressure drop) caused by the anticipated work practice of ducting the air flow.

Average velocities at the inlet port varied from approximately 1,050 feet per minutes to 1,400 feet per minute, and were consistent throughout the test procedures. No decrease in velocity was noted as a result of opening all of the ports to the maximum of twelve tested.

The ducting of air from the ports via the length of flex duct indicated an approximate 40% loss in velocity, dropping from an average of 1,400 feet per minute to 850 feet per minute. (This agrees reasonably well with theoretical predictions of loss through this type of ductwork with the length and configuration tested.)

Figure 6:
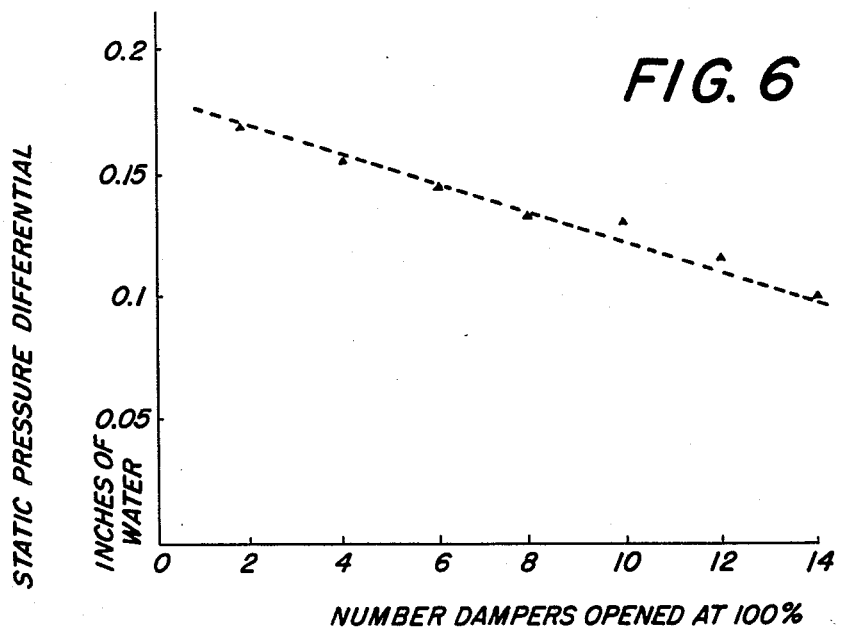
FIG. 6 is a graphical representation of static pressure differential verses the number of dampers opened.

A drop in static pressure between the work area and the occupied floor above, as the various manifold ports were opened, was anticipated and fairly well predicted in a straight line relationship (FIG. 6). However, the differential did not go below 0.08 inch of water, which still exceeds the current accepted 0.02 inch of water differential between work area and adjacent spaces.

The configuration of the inlet ports only permitted velocity measurements at approximately two feet from the intake of outside air (where flex ducts were not attached). This area would have been characterized by some turbulence (vena contracta) and which would have contributed to some variability in the velocity measurement. It should also be noted that duct flow evaluation was performed with a canvas spiral flex duct (substantial velocity loss due to friction) having two right angle elbows to simulate worst case conditions. Smooth, light-weight polyethylene duct if properly supported at elbows and junctions is a better duct material due to lower friction loss. In addition, if the duct/port locations can be situated so that only one right angle would be necessary to effectively direct air flows, friction losses are reduced as well.

The data indicate that a substantial flow of air can be ducted and directed to the specific work site by manipulation of the make-up air supply. This is particularly significant in a larger asbestos work area such as an entire evacuated floor of an office building, where the distances involved present the problem of sizable dead spots and negligible air flow with make-up air only being admitted through the decontamination unit. While the use of the standard corrugated flex duct poses large velocity/pressure losses, (due to friction) which would be unacceptable in most ventilation application, the lengths of ducting necessary in even a large work zone are usually short enough and the velocities low enough that this does not pose a significant hindrance. While there was no specific desired velocity targeted, a velocity of 500–850 feet per minute from a sustantial length of duct was viewed as an improvement over the standard negative air enclosure conditions where make-up air is provided only through the decontamination unit.

Loss of a negative pressure differential (the primary engineering control during asbestos removal), is a potential problem any time substantial quantities of air are allowed into a negative pressure enclosure. Therefore, any auxiliary make-up scheme must be diligently monitored for loss of pressure differential, and adjusted accordingly. As can be seen from the graph in FIG. 6, even though there was a loss in negative pressure differential as more ports were opened, the differential remained well above the currently accepted 0.02 inch of water.

The manually controlled dampers were sufficient to control the auxiliary air flow and are essential to ensure pressure differentials between the work area and surrounding spaces are maintained. Control of unusual flow rates as may develop via changing atmospheric conditions must also be considered, and for this reason, damper controlled ports are necessary.

The use of air changes per hour as a criteria for engineering controls has well recognized shortcomings. Here, a negative air circulation scheme has been described in terms of spedific velocity and negative pressure differential requirements for a specific operation. This is a solution to some of the problems inherent in the typical negative air enclosure of asbestos work sites.

Without further elaboration the foregoing will so fully illustrate our invention that others may, by applying current or future knowledge, adopt the same for use under various conditions of service.

I claim:

1. A method of removing airborne contaminant material from a work area where contaminant material is being removed, said method comprising the steps of:
    isolating said work area from the surrounding environment;
    providing at least one entrance into said isolated work area;
    creating a negative pressure differential between said isolated work area and the area outside said work area;
    introducing air into said isolated work area directly to the vicinity where said contaminant material is being removed in order to entrain airborne contaminant material created when said contaminant material is being removed;
    providing manifold means between said isolated work area and said area outside said work area for controlling the introduction of air into said work area and for directing the flow of air to the vicinity where said contaminant material is being removed, said manifold means being comprised of:
        a backboard positioned between said work area and the area outside said work area, said backboard having at least one opening therethrough,
        duct means extending into said work area to the vicinity where said contaminant material is being removed for providing air directly thereto,
        sleeve means connected to said duct means and in communication with said opening through said backboard extending into said work area for connecting said duct means to said backboard in communication with said opening, and
        air flow control means within said sleeve means for controlling the flow of air from outside said work area into said work area through said sleeve means and said duct means; and
    filtering the air within said isolated work area to remove said entrained contaminant material therefrom.

2. A method as claimed in claim 1, wherein:
    said step of creating a negative pressure differential comprises exhausting air from said isolated work area; and
    said filtering step occurs as said air is being exhausted from said isolated work area.

3. A method as claimed in claim 1, wherein said steps of creating a negative pressure differential and filtering said air within said work area comprise positioning HEPA filter units within said work area and exhausting the air within said work area containing said airborne contaminants through said filter units to a location outside said isolated work area.

4. A method as claimed in claim 1, wherein said steps of introducing air into said work area and filtering the air within said work area comprise introducing said air directly up-stream of the area where said contaminant material is being removed and positioning filtering devices downstream of said area where said contaminant material is being removed, whereby an air sweep is created in the direction of said filtering devices.

5. A method as claimed in claim 4, wherein said step of creating a negative pressure differential comprises exhausting said air sweep in the direction of said filters through said filter units to a location outside said work area.

6. A method as claimed in claim 1, further comprising regulating by means of said air flow control means the velocity of air ducted to the vicinity where said contaminant material is being removed.

7. A method as claimed in claim 6, wherein said air ducted through said duct means to the vicinity where said contaminant material is being removed is provided at a velocity of 500–850 feet per minute.

8. A method as claimed in claim 1, wherein said negative pressure differential is at least 0.08 inches of water.

9. A method as claimed in claim 1, wherein said air flow control means comprises a damper within said sleeve means.

10. A method as claimed in claim 9, wherein said damper is rotatable within said sleeve means.

11. A method as claimed in claim 1, wherein said manifold means further comprises one-way flow control means associated with said duct means for permitting air flow only into said work area through said duct means.

12. A method as claimed in claim 11, wherein:

said duct means comprises a tubular duct connected to said sleeve means at a first end thereof and said tubular duct being open at a second end thereof extending into said work area; and said flow control means comprises flap means fitted over said second end of said duct means within said work area for closing said open end when the air pressure within said work area is greater than the air pressure in said tubular duct.

* * * * *